United States Patent [19]

Suzuki et al.

[11] Patent Number: 4,774,592
[45] Date of Patent: Sep. 27, 1988

[54] IMAGE READER USING A PLURALITY OF CCDS

[75] Inventors: Shigeru Suzuki; Harumitsu Mashiko, both of Yokohama, Japan

[73] Assignee: Ricoh Company, Ltd., Tokyo, Japan

[21] Appl. No.: 914,776

[22] Filed: Oct. 3, 1986

[30] Foreign Application Priority Data

Oct. 8, 1985 [JP] Japan .................................. 60-223927
Oct. 8, 1985 [JP] Japan .................................. 60-223929

[51] Int. Cl.$^4$ ......................... H04N 1/415; H04N 3/14
[52] U.S. Cl. ............................... 358/285; 358/213.28; 358/294
[58] Field of Search .............. 358/285, 293, 256, 216, 358/225, 29, 213.3, 213.28

[56] References Cited

U.S. PATENT DOCUMENTS

| | | | |
|---|---|---|---|
| 4,465,939 | 8/1984 | Tamura | 358/294 |
| 4,675,745 | 6/1987 | Suzuki | 358/285 |
| 4,692,795 | 9/1987 | Nakao | 358/294 |
| 4,712,134 | 12/1987 | Murakami | 358/285 |

Primary Examiner—Tommy P. Chin
Attorney, Agent, or Firm—Oblon, Fisher, Spivak, McClelland & Maier

[57] ABSTRACT

An image reader for digitally reading an image on an original document by causing at least two aligned CCDs to commonly read an overlapping portion of the image which corresponds to a joint portion of the CCDs and by cancelling pixel data read by one of the CCDs. A first CCD is mounted on a base plate. A second CCD is fixed in place on one or free end portion of a support plate the other end of which is rigidly connected to the base plate. The base plate and the support plate are different from each other in the coefficient of thermal expansion. In order to compensate for a change in the ratio of an overlapping portion of the image due to an expansion or a contraction of the base plate which is caused by a temperature variation, a predetermined relationship is set up between the positions of the first and second CCDs and that of the support plate relative to the base plate and the coefficients of thermal expansion of the base plate and support plate. Temperatures of the base plate are sensed so that an expansion or a contraction of the base plate is computed based on the sensed temperature, thereby determining a deviation of the overlapping portion. Data outputted by the CCDs are processed in response to the determined deviation.

5 Claims, 5 Drawing Sheets

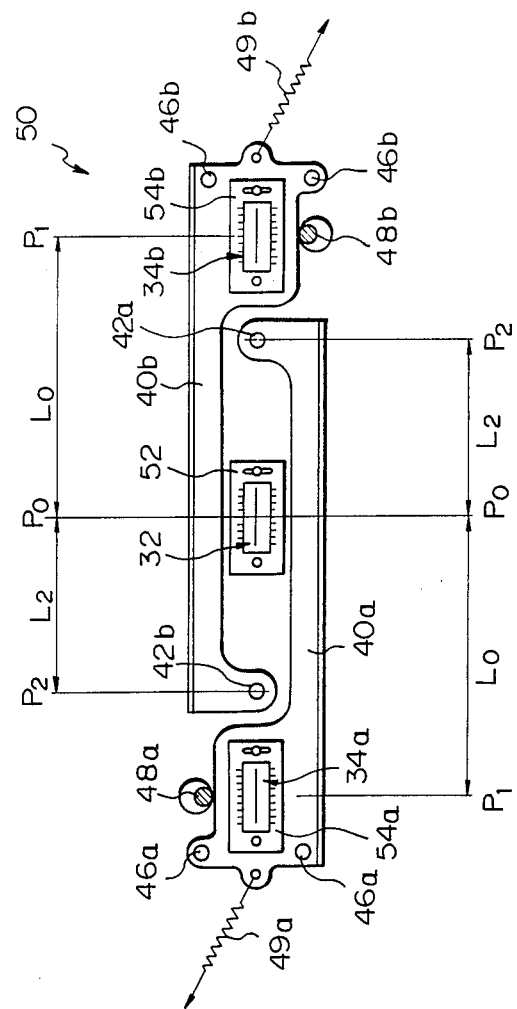

IMAGE READER USING A PLURALITY OF CCDS

BACKGROUND OF THE INVENTION

1. Field of the Invention

The present invention relates to an image reader for use with a digital copier or the like which uses charge coupled devices (CCDs) and other elements for reading an image on an original document as digital information.

2. Discussion of Background

Generally, a digital image reader uses a CCD or like image reading device for reading an image on an original document which is slit-exposed in a manner known in the art. Such a digital image reader allows images to be edited in a great number of different manners, compared to an analog copier and others. The prerequisite for a digital image reader to provide imabes which are comparable with those provided by an analog system is the increase in pixel density. Meanwhile, where a document to be read is a drawing or the like which is sized A1 or A0, for example, the number of pixels is so large that the pixels cannot be accommodated by a single CCD. Specifically, because the maximum number of pixels presently available with a CCD is 5000, for a pixel density of 16 pixels per millimeter, for example, only a document image which is about 300 millimeters wide can be accommodated. It follows that to read, for example, a A0 size document image whose width is 841 millimeters at a pixel density of 16 pixels per millimeter, three CCDs are required since the necessary number of pixels is $841 \times 16 = 1845$.

Usually, such a plurality of CCDs are mounted in line on a base plate. In order that a document image may be prevented from being lost in a joint portion of nearby CCDs, the nearby CCDs read a document image corresponding to the joint portion in an overlapping relation and, then, the image data ready by any of the two CCDs is cancelled. In this situation, it is necessary for each of the CCDs to be positioned with considerable accuracy on the base plate. However, because the base plate is usually implemented with a plain steel sheet, its temperature varies during operation of the image reader with the result that its dimensions are varied due to thermal expansion. The change in the dimensions of the base plate is reflected by a change in the ratio of the overlapping portion of a document image which corresponds to the joint portion of the nearby CCDs and is read by the CCDs in an overlapping relation, resulting in inaccurate image reading operations. Therefore, in an image reader of the type having a plurality of CCDs arranged in an array on a base plate, the positional relationship, i.e., distance between the nearby CCDs mounted on the base plate and data read by the CCDs have to be compensated as the dimensions of the base plate are changed by thermal expansion.

SUMMARY OF THE INVENTION

It is an object of the present invention to provide an image reader which is operable with accruacy by supressing changes in the distance between nearby reading devices thereof due to temperature variations to a negligible degree.

It is another object of the preset invention to provide an image reader which prevents data to be lost in a joint portion of nearby reading devices thereof even if the distance between the reading devices is changed due to temperature variation.

It is another object of the present invention to provide a generally improved image reader using a plurality of CCDs.

In accordance with the present invention, there is provided an apparatus for digitally reading an image on an original document by using a plurality of reading devices which are arranged in line with each other, comprising a first reading device located in a reference position, a base plate supporting the first reading device fixedly in the reference position, a support plate having one end which is rigidly connected to the base plate at a point of connection on the base plate and the other end which is a free end, the support plate having a coefficient of thermal expansion ($\alpha_2$) which is different from that ($\alpha_1$) of the base plate, and a second reading device fixed in place on the support plate adjacent to the free end. The ratio of a distance ($L_1$) between the point of connection on the base plate and the first reading device to a distance ($L_2$) between the point of connection and the second reading device ($L_1/L_2$) is inversely proportional to the ratio of the coefficient of thermal expansion ($\alpha_1$) of the base plate to that ($\alpha_2$) of the support plate ($\alpha_1/\alpha_2$), i.e. $L_1/L_2 = \alpha_2/\alpha_1$.

In accordance with the present invention, there is also provided an apparatus for digitally reading an image on an original document by causing at least two CCDs, which are arranged in line, to commonly read an overlapping portion of the image which corresponds to a joint portion of the CCDs, the apparatus comprising a first and a second CCDs each having a predetermined number of CCD elements, a base plate fixedly supporting the first and second CCDs which are arranged in line, a temperature sensor mounted on the base plate for sensing temperatures of the base plate, and an operation control unit for computing an expansion and a contraction of the base plate in response to a temperature of the base plate sensed by the temperature sensor, and processing pixel data read by the CCDs such that in response to the expansion and contraction data output from the reading elements of one of the first and second CCDs which have commonly read the overlapping portion of the image are cancelled.

The above and other objects, features and advantages of the present invention will become more apparent from the following detailed description taken with the accompanying drawings.

BRIEF DESCRIPTION OF THE DRAWINGS

FIGS. 3 and 4 show a second embodiment of the present invention in a plan view and a fragmentary enlarged sectional view, respectively;

DESCRIPTION OF THE PREFERRED EMBODIMENTS

Figure 1:
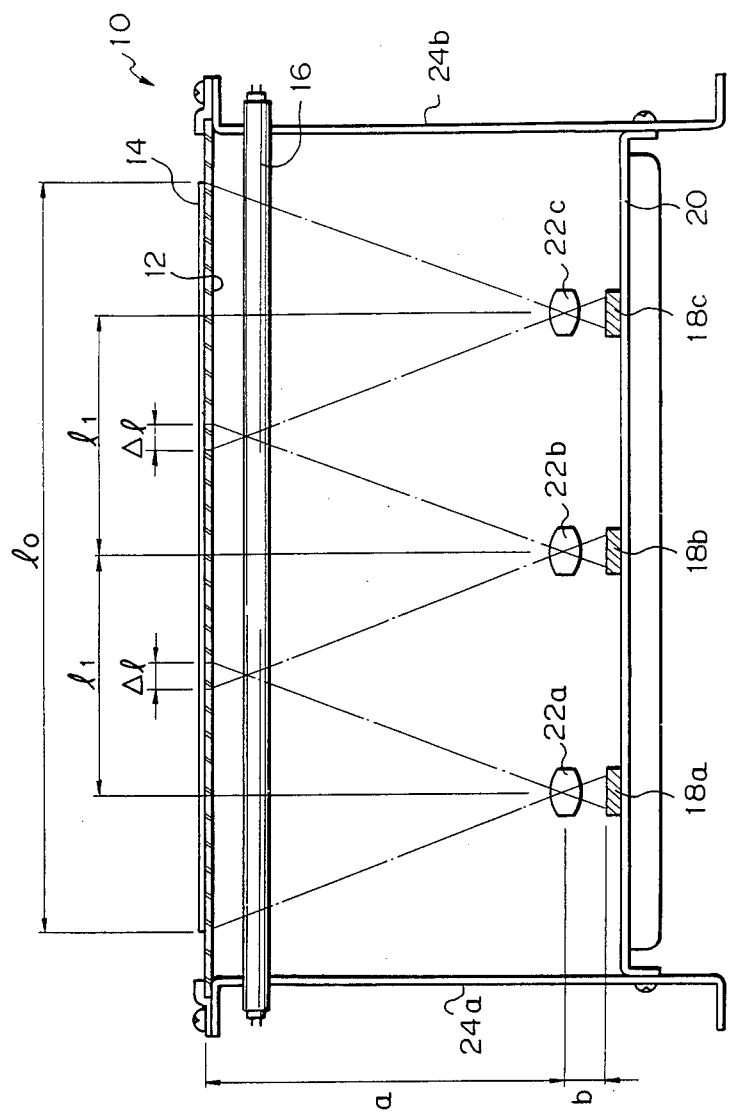
FIG. 1 is a schematic sectional side elevation of a prior art image reader of the type using a plurality of CCDs.

To better understand the present invention, a brief reference will be made to a prior art image reader, shown in FIG. 1. The prior art image reader, generally 10, comprises a platen 12 on which an original document 14 is laid, a lamp 16 for illuminating the document 14 for slit exposure, three CCDs 18a, 18b and 18c mounted in line on a base plate 20, lenses 22a, 22b and 22c for focusing images onto the CCDs 18a, 18b and 18c, respectively, and side panels 24a and 24b adapted to support the platen 12, lamp 16 and base plate 20 as well as others.

In FIG. 1, assume that the document 14 on the platen 12 has an A0 size whose width $l_0$ is 841 millimeters (13456 pixels), and that the CCDs 18a, 18b and 18c are each provided with 5000 elements and arranged one after another at pitches $l_1$ of 280 millimeters. Then, in order that a document image may be prevented from lost in a joint portion of each nearby CCDs, it is necessary that an image portion of the document 14 which is to be read commonly by the nearby CCDs 18a and 18b or 18b and 18c, i.e., overlapping portion be provided with a dimension $\Delta l$ which corresponds to 130 pixels. The overlapping 130 pixels are read by the CCDs 18a, 18b and 18c to be delivered as overlapping image signal data. At this instant, the data output from either one of the CCDs 18a and 18b and that from either one of the CCDs 18b and 18c are cancelled, whereby image signal data which are continuous as a whole are delivered.

Assuming that the pitches of the light-sensitive elements of each CCD is 7 microns, and that the document read pixel density is 16 pixels per millimeter, the projection magnification m of a document image to each CCD is expressed as $m = b/a$ were a is the distance between the document and the lens and b, the distance between the lens and the CCD, as shown in FIG. 1. Specifically, the magnification m is approximately 1/8.926.

When the base plate 20 is implemented with an plain structural steel sheet, its coefficient of thermal expansion is approximately $11 \times 10^{-6}$. Then, assuming that the temperature variation of the image reader 10 is 20° C., the pitches $l_1 = 280$ millimeters of the CCDs 18a, 18b and 18c are changed in dimensions by $280 \times 20 \times 11 \times 10^{-6} = 0.062$ millimeters. This corresponds to about nine light-sensitive elements of the CCDs 18a, 18b and 18c and, in terms of dimensions on the document 14, $0.062 \times 8.926 = 0.553$ millimeters. Such temperature variations are caused partly by changes in ambient temperature and partly by temperature elevations of the device 10 itself due to activation of a power source, lamp etc. In any case, while the number of elements to overlap each other may be selected each time depending upon the operating temperature condition, such is undesirable from an operation efficiency standpoint. In light of this, the overlapping amount is usually fixed at a value which is associated with a standard temperature.

However, a problem with the fixed overlapping amount is that when the pitches of the CCDs 18a, 18b and 18c is lengthened by 0.062 millimeters, for example, 0.553 millimeters of image data are lost in each joint portion on the document 14; when the pitchs is shortened, on the other hand, overlapped image data are produced in the joint portion. The fixed overlapping amount scheme, therefore, fails to fully compensate for temperature variations and, therefore, to read images with accuracy.

Although the base plate 20 may be implemented with a material whose coefficient of thermal expansion is small, e.g., Invar having a coefficient of thermal expansion of $1.2 \times 10^{-6}$, such a material lacks precision and, moreover, adds to the cost. Another expedient for the compensation of dimensions in relation to temperature known in the art is the structure which is associated with a pendulum of a clock. It is difficult, however, for such a structure to be applied to a CCD mounting structure which needs considerable accuracy.

In any case, it is preferably in practice that the dimensional changes of the base plate 20 due to temperature changes be suppressed to less than a half of the pixel pitches of the CCDs 18a, 18b and 18c. Also, it is necessary that the CCDs 18a, 18b and 18c and their associated lenses 22a, 22b and 22c be mounted on the base plate 20 integrally with each other so as to maintain them in a predetermined positional relationship.

Figure 2:
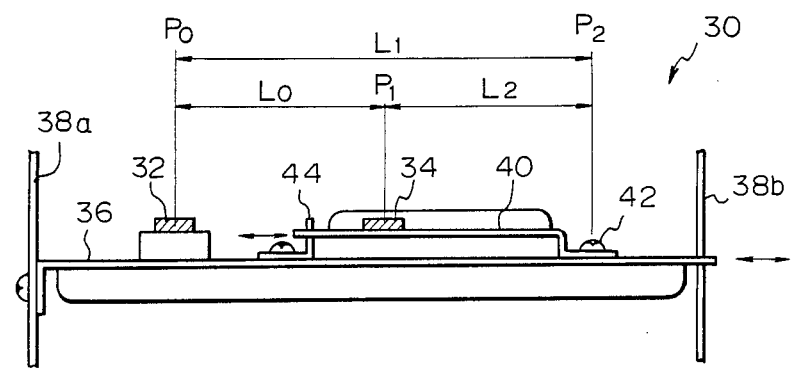
FIG. 2 is a schematic sectional side elevation showing a basic construction of an image reader in accordace with a first embodiment of the present invention.

Referring to FIG. 2, an image reader in accordance with a first embodiment of the present invention is shown and generally designated by the reference numeral 30. As shown, the image reader 30 is provided with two CCDs 32 and 34. Specifically, the CCD 32 which serves as a reference reading device is mounted in a predetermined position on a base plate 36 which is fixed at one end to one of two side panels 38a and 38b. The other CCD 34 is not directly mounted on the base plate 36, that is, it is mounted on a support plate 40. While one end of the support plate 40 which is remote from the CCD 32 is fastened by a screw 42 to the base plate 36, the other end of the plate 40 is left free although sustained by a guide member 44. The CCD 34 is located adjacent to the free end of the plate 40. The base plate 36 has a coefficient of thermal expansion $\alpha_1$ of $11 \times 10^{-6}$ and made of, for example, a plain structural steel sheet. The support plate 40, on the other hand, is made of a material which is different in the coefficient of thermal expansion from the base plate 36. In this particular embodiment, the plate 40 is implemented with aluminum alloy whose coefficient of thermal expansion $\alpha_2$ is $23 \times 10^{-6}$.

Hereinafter will be described mounting dimensions and others of the CCDs 32 and 34 and the like. Assume that the position of the CCD 32 is $P_0$, that of the CCD 34 is $P_1$, the point where the element support plate 40 is fastened to the base plate 36 by the screw 42 is $P_2$, and the necessary distance between $P_0$ and $P_1$ is $L_0$ which is 280 millimeters. In this particular embodiment, the ratio of a distance $L_1$ between the points $P_2$ and $P_0$ to a distance $L_2$ between the points $P_2$ and $P_1$, i.e., $L_1/L_2$ is selected to be inversely proportional to the ratio of the coefficient of thermal expansion $\alpha_1$ of the base plate 36 to that $\alpha_1$ of the support plate 40, i.e. $L_1/L_2 = \alpha_2/\alpha_1$. In this construction, even if the distances, or lengths, $L_1$ and $L_2$ are respectively changed into $L'_1$ and $L'_2$ at a temperature t, the distance $L_0$ between the CCDs 32 and 34 remains unchanged. That is, basically the distance $L_0$ is expressed as $$L_0 = L_1 - L_2$$

At the temperature t, there hold equations $$L'_1 = L_1(1 + \alpha_1 \cdot t)$$

$$L'_2 = L_2(1+\alpha_2 \cdot t)$$

Therefore, the length $L'_0$ is produced by $$\begin{aligned}
L'_0 &= L'_1 - L'_2 \\
&= L_1(1 + \alpha_1 \cdot t) - L_2(1 + \alpha_2 \cdot t) \\
&= (L_1 - L_2) + (L_1 \cdot \alpha_1 - L_2 \cdot \alpha_2)t
\end{aligned}$$

Due to the previously stated dimensional relationship $L_1/L_2 = \alpha_2/\alpha_1$, the term $(L_1 \cdot \alpha_1 - L_2 \cdot \alpha_2)$ to which the temperature is related becomes zero and, hence, $$\begin{aligned}
L'_0 &= L'_1 - L'_2 \\
&= L_1 - L_2 = L_0
\end{aligned}$$

As regards specific values of $L_1$ and $L_2$, because $L_1 = L_0 + L_2 = 280 + L_2$, $$\frac{L_1}{L_2} = \frac{280 + L_2}{L_2} = \frac{\alpha_2}{\alpha_1} = \frac{23}{11}$$

$L_2$ is 256.7 millimeters long and $L_1$ is 536.7 millimeters long.

Figure 4:
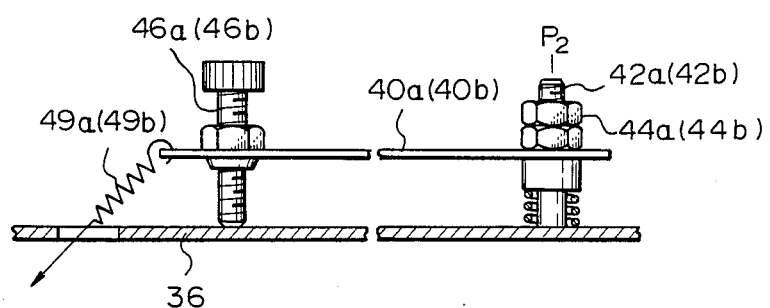

Referring to FIGS. 3 and 4, a second embodiment of the present invention is shown. In FIGS. 3 and 4, the same or similar structural elements as those shown in FIG. 2 are designated by like reference numerals. As shown, the image reader, generally 50, is provided with three CCDs 32, 34a and 34b. Specifically, CCDs 34a and 34b are arranged in line with and at opposite sides of the CCD 32 which serves as a reference CCD. The reference CCD 32 is mounted at the center $P_0$ of the base plate 36, FIG. 4. Two independent support plates 40a and 40b are positioned in such a manner as to hold the CCD 32 therebetween. One end of the plate 40a is fastened by a screw 42a and a nut 44a to the base plate 36 to define a point of connection $P_2$. Likewise, one end of the plate 40b is fastened to the base plate 36 by a screw 42b and a nut 44b to define a point of connection $P_2$. The CCD 34a is mounted on the other or free end of the plate 40a, and the CCD 34b on the other or free end of the plate 40b. It is to be noted that the distances $L_0$, $L_1$ and $L_2$ and other dimensions are selected in the same manner as in the embodiment of FIG. 2. Screws 46a and 46b are respectively threaded into the free ends of the plates 40a and 40b while abutting against the base plate 36. The screws 46a and 46b are adapted to adjust the degree of parallelism and height of their associated plates 40a and 40b relative to the base plate 36. Eccentric guide posts 48a and 48b are respectively positioned beside the free ends of the plates 40a and 40b in order to align the CCDs 34a and 34b with the CCD 32. Further, springs 49a and 49b are respectively anchored to the free ends of the plates 40a and 40b such that they constantly bias their associated plates 40a and 40b outwardly against the guide posts 48a and 48b. As shown in FIG. 4, each of the springs 49a and 49b extends somewhat downwardly to fulfill another function of holding the lower end of the adjusting screw 46a or 46b in abutment against the base plate 36 and, thereby, preventing the free end of the plate 40a or 40b from rising. CCD submounts 52, 54a and 54b adapted for the correction of misalignment are associated with the CCDs 32, 34a and 34b, respectively.

The construction of FIGS. 3 and 4, based on the principle as shown in FIG. 2, prevents the distance $L_0$ between each of the CCDs 34a and 34b and the CCD 32 from being effected by temperature, so that the image reader 50 is capable of reading images under conditions which are initially set up.

As shown and described, in accordance with the first and second embodiments of the present invention, there are used a base plate on which a reference reading device is mounted and a support plate which is different reading device is mounted and a support plate which is different in coefficient of thermal expansion from the base plate. The support plate is fastened at one end thereof to the base plate and provided at the other or free end with another reading device. Various dimensions are set up based on a ratio in coefficient of thermal expansion between the base plate and the support plate. Upon a change of temperature, such a construction cancels temperature factors by virtue of the difference in the coefficient of thermal expansion between the base plate and the support plate, thereby allowing a minimum of change to occur in the distance between the reading devices. This promotes image reading with no overlap or loss of image otherwise brought about in a joint portion of the nearby reading devices.

Figure 5:
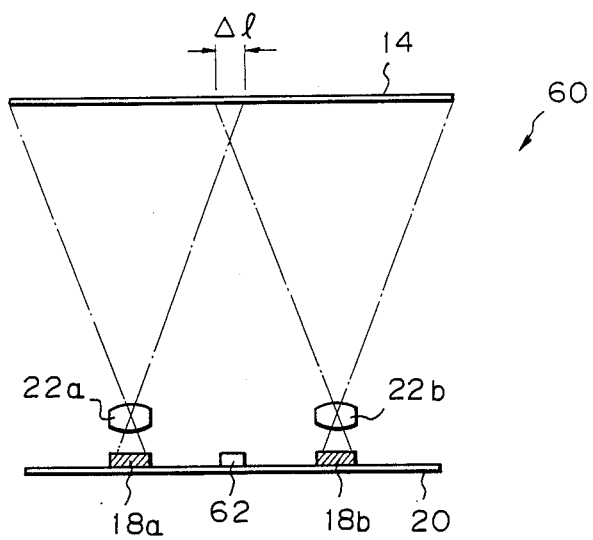
FIG. 5 is a schematic sectional side elevation showing a basic construction of a third embodiment of the present invention.

Referring to FIGS. 5 to 8, a third embodiment of the present invention is shown. While the image reader 60 in accordance with this embodiment is essentially similar to that of FIG. 1, let it be assumed for the simplicity of description that two CCDs 18a and 18b are arranged in line on the base plate 20, as shown in FIG. 5. In FIG. 5, the same or similar structural elements as those shown in FIG. 1 are designated by like reference numerals. An overlapping portion whose length is $\Delta l$ is defined in that region of the document 14 which is read by the CCDs 18a and 18b. In this particular embodiment, each of the CCDs 18a and 18b has 5000 elements. As shown in FIG. 6A, at a temperature of 0° C. which is the reference temperature, the CCDs 18a and 18b overlap each other by 50 pixels. Specifically, elements Nos. 4950 to 5000 of the CCD 18a an elements Nos. 1 to 50 of the CCD 18b overlap each other.

Figure 7:
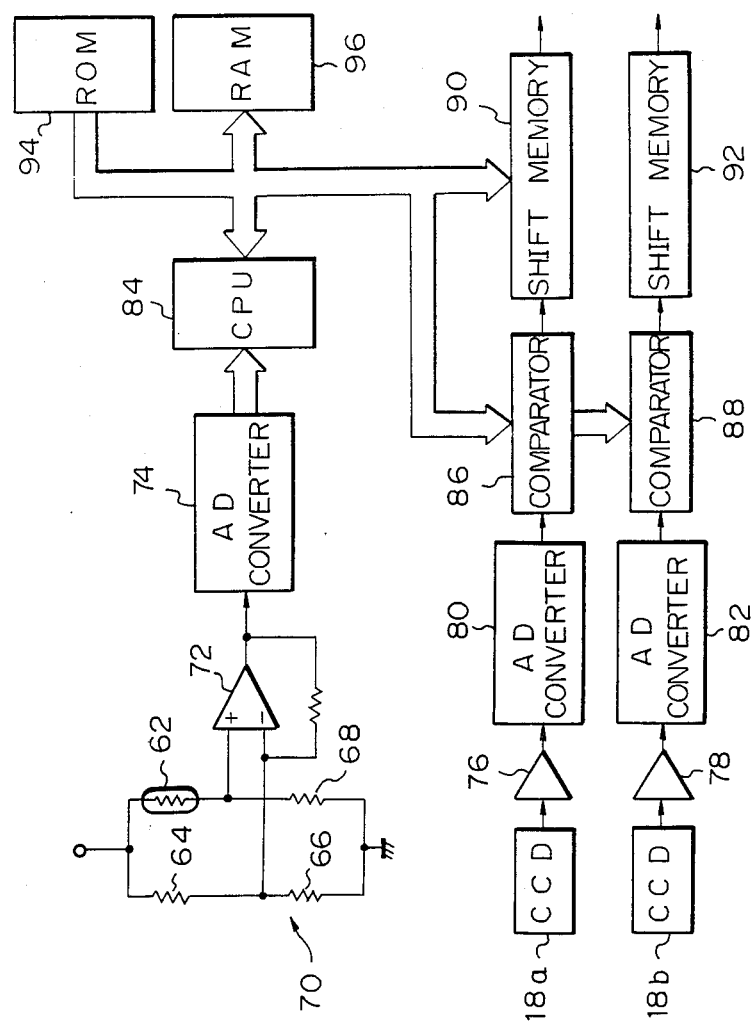
FIG. 7 is a block diagram of an operation control system in accordance with the embodiment of FIG. 5.

As shown in FIG. 5, a thermistor 62 is mounted on the base plate 20 to serve as a temperature sensor which is sensitive to the temperature of the base plate 20. As shown in FIG. 7, the thermistor 62 constitutes a bridge circuit 70 together with three resistors 64, 66 and 68. The output of the thermistor 62 is routed to an analog-to-digital (AD) converter 74 via an operational amplifier (OP AMP) 72. A temperature (°C.) to output voltage $V_0$ (V) characteristic of the thermistor 62 in this particular embodiment is tabulated below.

| TEMP (°C.) | VOLTAGE $V_0$ (V) | TEMP (°C.) | VOLTAGE $V_0$ (V) |
|---|---|---|---|
| −10 | −2.867 | 55 | −1.328 |
| −5 | −2.807 | 60 | −1.179 |
| 0 | −2.735 | 65 | −1.033 |
| 5 | −2.653 | 70 | −0.895 |
| 10 | −2.559 | 75 | −0.763 |
| 15 | −2.454 | 80 | −0.639 |
| 20 | −2.337 | 85 | −0.522 |
| 25 | −2.211 | 90 | −0.415 |
| 30 | −2.075 | 95 | −0.314 |
| 35 | −1.932 | 100 | −0.225 |
| 40 | −1.785 | 105 | −0.141 |
| 45 | −1.633 | 110 | −0.064 |

-continued

| TEMP (°C.) | VOLTAGE Vo (V) | TEMP (°C.) | VOLTAGE Vo (V) |
|---|---|---|---|
| 50 | −1.480 | | |

The AD converter 74 is constructed to produce digital outputs of, for example, 50 to 0 in response to the outputs of the thermistor 62 which are representative of temperatures of the base plate 20 of, for example, 0° C. to 100° C.

The outputs of the CCDs 18a and 18b are respectively interconnected to amplifiers 76 and 78 which are in turn interconnected to AD converters 80 and 82, respectively, whereby image data read by the CCDs 18a and 18b are converted into digital signals. The output of the AD converters 80 and 82 are respectively compared with a predetermined value (a single threshold value in the case of character data, and dither data in the case of pictures and photographs) which is fed from a central processing unit (CPU) 84 thereto. The resultant two-level outputs of the comparators 86 and 88 are fed to shift memories 90 and 92, respectively.

Figure 8:
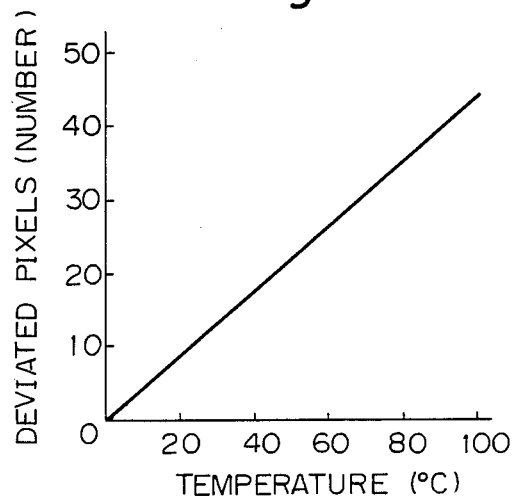
FIG. 8 is a graph showing a relationship between temperature elevation and the number of pixels deviated.

The CPU 84 plays the role of operation control means and to which a read only memory (ROM) 94 and a random access memory (RAM) are interconnected. While the base plate 20 with the CCDs 18a and 18b mounted thereon expands and contracts due to temperature variations to change the distance between the CCDs 18a and 18b, a compensation table associated with temperature data is stored in the ROM 94. As shown in FIG. 8, the compensation table comprises a graph which is representative of a relationship between the temperatures of the base plate and the numbers of deviated pixels in the overlapping portion of the CCDs 18a and 18b.

Figure 6A:
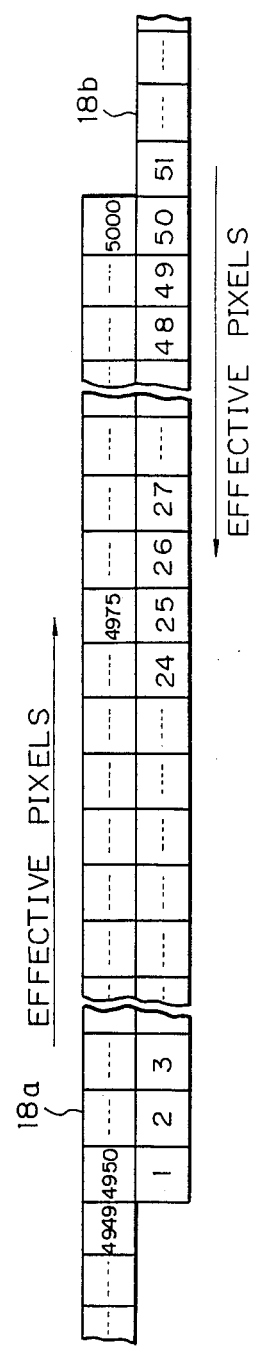
FIGS. 6A and 6B are enlarged views of two different conditions of an overlapping portion of a document image which is to be read by both of two nearby CCDs.

First, when the temperature of the substrate 20 is 0° C., the CCDs 18a and 18b overlap each other by 50 pixels in the overlapping portion, as shown in FIG. 6A. In this condition, the pixel data read by the elements of the CCD 18a up to the element No. 4975 are regarded as effective pixel data, and the pixel data read by the elements Nos. 26 and onward of the CCD 18b are regarded to be so. This eliminates the loss and overlap of image data in the joint portion of the CCDs 18a and 18b.

Figure 6B:
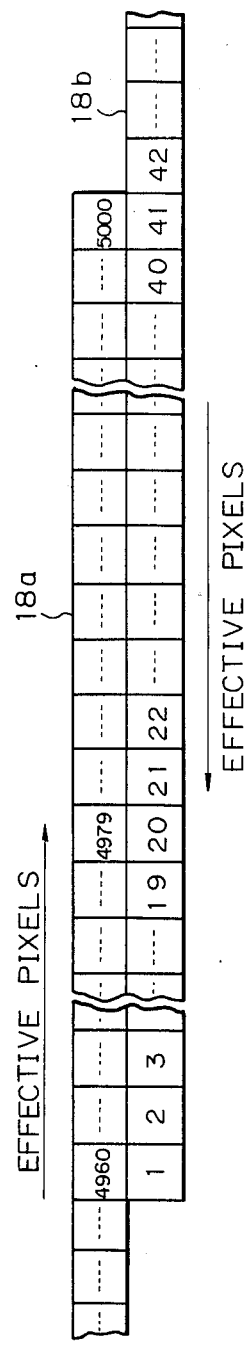

Assume that the thermistor 62 has sensed that the base plate 20 is at a temperature of 20° C. In response, the CPU 84 references the compensation table stored in the ROM 94 to see that, in the plot of FIG. 8, a 9 pixels of deviation has occurred at the temperature of 20° C. FIG. 6B shows this condition wherein due to the 9 pixels of deviation elements Nos. 4960 to 5000 of the CCD 18a overlap with elements Nos. 1 to 41 of the CCD 18b. Seeing the expansion by 9 pixels, the CPU 84 changes the positions where pixel data are to be decided effective. Specifically, under this condition, should the pixel data up to that in the element No. 4975 of the CCD 18b and those in the element No. 26 and onward of the CCD 18b be processed as effected pixel data as has been the case with the 0° C. condition, 9 pixels of image would be lost between the CCDs 18a and 18b.

In this particular embodiment, because the CPU 84 decides that a 9 pixels of expansion has occurred, the 9 pixels are divided into four pixels and five pixels (bisected if the number is even) so that the pixel data read by the elements of the CCD 18a up to the element No. 4979 and those read by the elements No. 21 and onward of the CCD 18b are processed as effective pixel data.

Such position change data are selected out of the compensation table of ROM 94 under the control of the CPU 84 and, then, applied to the shift memories 90 and 92, whereby the first and the last addresses to be read out are set up.

In the above-described manner, the positions in the overlapping portion of pixel data as read by the CCDs 18a and 18b where the data are to be processed as effective pixel data are changed in response to a temperature of the base plate 20. Hence, despite any shift in the position of the plate 20 and, therefore, those of the CCDs 18a and 18b, accurate read processing is ensured with no loss or overlap of data in the joint portion of the CCDs 18a and 18b by processing pixel data read out.

As described above, the third embodiment of the present invention uses a temperature sensor sensitive to temperatures of a base plate on which reading elements are mounted, and operation control means which in response to an output of the temperature sensor computes an expansion or a contraction to change pixel positions where pixel data are to be processed as effective pixel data in an overlapping portion of reading devices. This offers an unprecedented advantage that even if the distance between the reading elements is effected by temperature changes. accurate image read processing is achievable with no loss or overlap of data in a joint portion of the reading devices.

Various modifications will become possible for those skilled in the art after receiving the teachings of the present disclosure without departing from the scope thereof.

What is claimed is:

1. An apparatus for digitally reading an image of an original document by causing at least two CCDs, which are arranged in line and which each include a plurality of reading elements, to commonly read an overlapping portion of said image which corresponds to a joint portion of said CCDs, said apparatus comprising:
   a first and a second CCD each having a predetermined number of CCD elements constituting said plurality of reading elements;
   a base plate fixedly supporting said first and second CCDs which are arranged in line;
   the temperature sensor mounted on said base plate for sensing temperatures of said base plate; and
   operation control means for computing an expansion and a contraction of said base plate in response to said temperature of said base plate sensed by said temperature sensor, and processing pixel data read by said CCDs such that in response to said computed expansion and contraction data, the output from said reading elements of one of said first and second CCDs, which have commonly read said overlapping portion of said imaging, are cancelled.

2. An apparatus as claimed in claim 1, wherein each of said first and second CCDs comprises 5000 CCD elements.

3. An apparatus as claimed in claim 1, wherein said temperature sensor comprises a thermistor.

4. An apparatus as claimed in claim 1, wherein said operation control means comprises:
   a read only memory (ROM) storing a compensation table which is representative of deviations of a number of said reading elements of said first and second CCDs due to changes in the temperature of said base plate; and
   a central processing unit (CPU) for computing a deviation of the number of said reading elements by referencing said compensation table stored in said ROM.

5. An apparatus as claimed in claim 4, further comprising a first and a second shift memories for respectively determining based on a result of computation by said CPU a first and a last addresses of reading which is performed by said fist and second CCDs.

* * * * *